(12) United States Patent
Pierson-Moonan et al.

(10) Patent No.: US 10,689,118 B2
(45) Date of Patent: Jun. 23, 2020

(54) BACK BREAKOVER RATE CONTROL DEVICE FOR HIC/NIJ DAMAGE REDUCTION

(71) Applicant: Rockwell Collins, Inc., Cedar Rapids, IA (US)

(72) Inventors: Jay Pierson-Moonan, Pfafftown, NC (US); Gregory J. Simecek, Winston Salem, NC (US); Bradley Barg, Advance, NC (US); Jeff B. Thompson, Lewisville, NC (US); Courtney James, Winston Salem, NC (US); Chad K. Hatch, Greensboro, NC (US); Jonathon Jarvis, Rural Hall, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 296 days.

(21) Appl. No.: 15/659,614

(22) Filed: Jul. 25, 2017

(65) Prior Publication Data

US 2019/0031352 A1 Jan. 31, 2019

(51) Int. Cl.
*B60N 2/42* (2006.01)
*B64D 11/06* (2006.01)
(Continued)

(52) U.S. Cl.
CPC .......... *B64D 11/064* (2014.12); *B60N 2/4221* (2013.01); *B60N 2/42709* (2013.01);
(Continued)

(58) Field of Classification Search
CPC ..... B60N 2/42; B60N 2/4228; B60N 2/42745
(Continued)

(56) References Cited

U.S. PATENT DOCUMENTS 3,280,942 A 10/1966 Millington
4,408,738 A 10/1983 Mazelsky
(Continued)

FOREIGN PATENT DOCUMENTS

DE 102014217506 A1 3/2016
EP 1065096 A1 1/2001
(Continued)

OTHER PUBLICATIONS

Eppinger, Rolf et al., "Development of Improved Injury Criteria for the Assessment of Advanced Automotive Restraint Systems—II", National Highway Traffic Safety Administration, National Transportation Biomechanics Research Center, Nov. 1999, 180 pages.
(Continued)

*Primary Examiner* — Christopher P Schwartz
(74) *Attorney, Agent, or Firm* — Suiter Swantz pc llo

(57) ABSTRACT

A device for controlling the breakover rate of a seatback in response to a dynamic event (regulating the breakover velocity so as to achieve optimal velocity differential to the impact velocity of a passenger's head impacting with the seatback) is attachable to the seatback and to the seat frame; when a breakover event is triggered, the passage of a head injury criterion (HIC) pin through a controlled traveling slot is impeded by energy absorbing materials selected, e.g. for material composition and structure, to restrict the breakover velocity of the seatback to optimize velocity differential between the breakover velocity and the impact velocity by engaging the HIC pin and deforming at a predetermined deformation rate.

5 Claims, 12 Drawing Sheets

(51) Int. Cl.
  *B60N 2/427* (2006.01)
  *B64D 25/04* (2006.01)
  *B60N 2/22* (2006.01)
(52) U.S. Cl.
  CPC ......... *B60N 2/42781* (2013.01); *B64D 25/04* (2013.01); *B60N 2/2236* (2013.01); *B60N 2/42745* (2013.01); *B64D 11/0619* (2014.12)
(58) Field of Classification Search
  USPC ................ 188/371–378; 297/216.13–216.19
  See application file for complete search history.

(56) References Cited

U.S. PATENT DOCUMENTS

| | | | |
|---|---|---|---|
| 5,273,240 | A | 12/1993 | Sharon |
| 5,722,722 | A | 3/1998 | Massara |
| 6,450,449 | B1 | 9/2002 | Podob et al. |
| 6,478,256 | B1 | 11/2002 | Williamson |
| 6,578,256 | B2* | 6/2003 | Takada ................ G01R 31/026 29/33 F |
| 6,588,557 | B2 | 7/2003 | Williams et al. |
| 6,907,391 | B2 | 6/2005 | Bellora et al. |
| 7,070,236 | B2* | 7/2006 | Kawashima ......... B60N 2/4228 297/216.1 |
| 7,854,477 | B2* | 12/2010 | Axelsson ............. B60N 2/4228 297/216.1 |
| 7,963,603 | B2* | 6/2011 | Pywell ................. F16F 9/5165 297/216.1 |
| 8,702,147 | B2* | 4/2014 | Cantor ................... B60N 2/24 296/65.02 |
| 8,777,308 | B2* | 7/2014 | Lee ...................... B60N 2/4228 297/216.13 |
| 2002/0047295 | A1* | 4/2002 | Sullivan ............... B60N 2/0232 297/216.1 |
| 2005/0140190 | A1* | 6/2005 | Kawashima ......... B60N 2/4228 297/216.14 |
| 2008/0100104 | A1* | 5/2008 | Axelsson ............. B60N 2/4228 297/216.1 |
| 2014/0070578 | A1* | 3/2014 | Szelagowski .......... B60N 2/427 297/216.13 |
| 2014/0217788 | A1* | 8/2014 | Norwood .............. B60R 21/233 297/216.12 |
| 2017/0259713 | A1* | 9/2017 | Kostin ................. B60N 2/0232 |
| 2018/0264979 | A1* | 9/2018 | Lasell .................... B60N 2/682 |

FOREIGN PATENT DOCUMENTS

| | | |
|---|---|---|
| EP | 1547857 A2 | 6/2005 |
| EP | 2127941 A1 | 12/2009 |
| GB | 2421277 A | 6/2006 |

OTHER PUBLICATIONS

IIHS Insurance Institute for Highway Safety; "Moderate Overlap Frontal Crashworthiness Evaluation Guidelines for Rating Injury Measures", Sep. 2014, 10 pages.

Extended European Search Report dated Dec. 11, 2018 for EP Application No. 18185421.7.

DeWeese, Richard, "Assessment of Head and Neck Injury Potential During Aircraft Longitudinal Impact", Federal Aviation Administration, Presented to The Eighth Triennial International Aviation Fire and Cabin Safety Research Conference, Oct. 27, 2016, 41 pages.

* cited by examiner

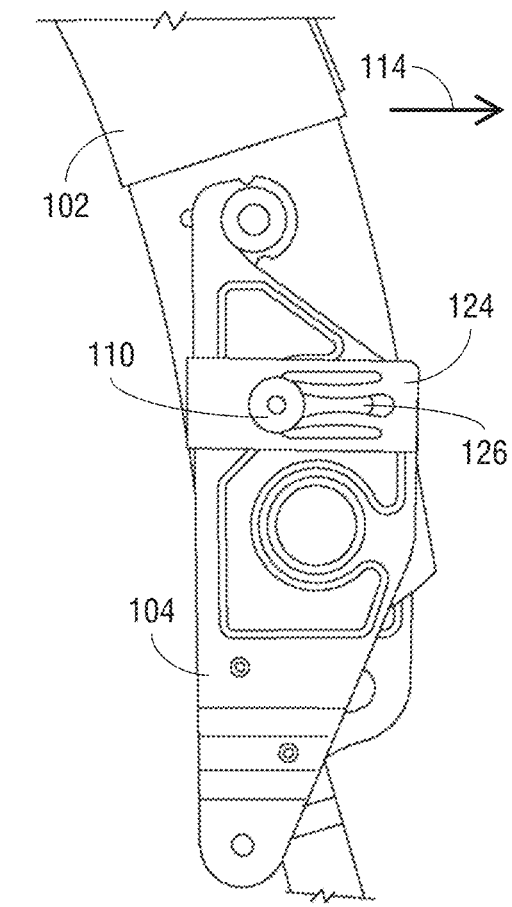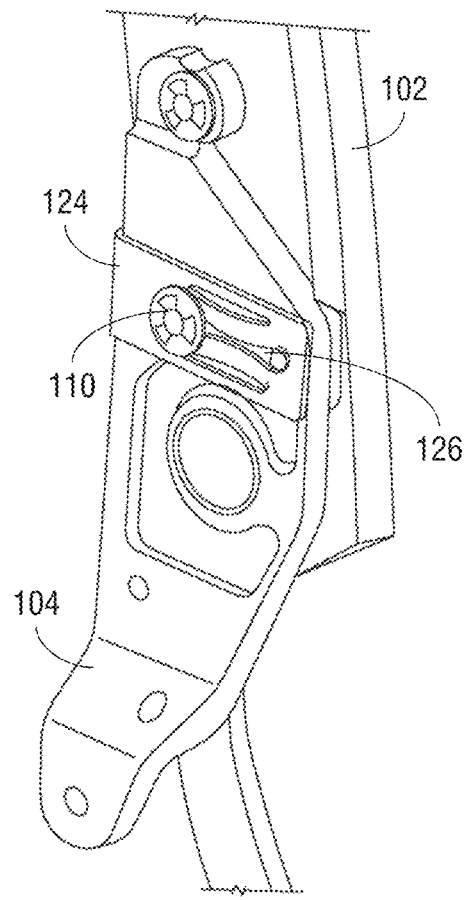
FIG. 3A                    FIG. 3B

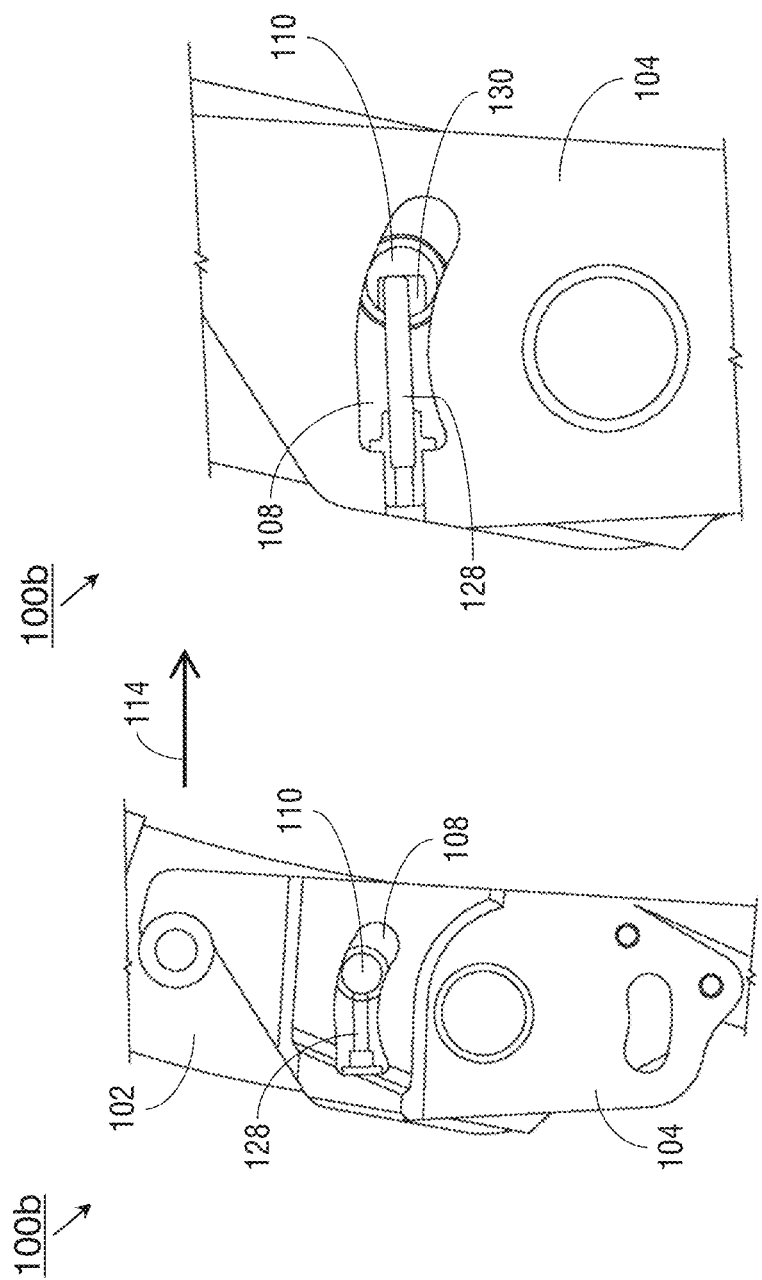

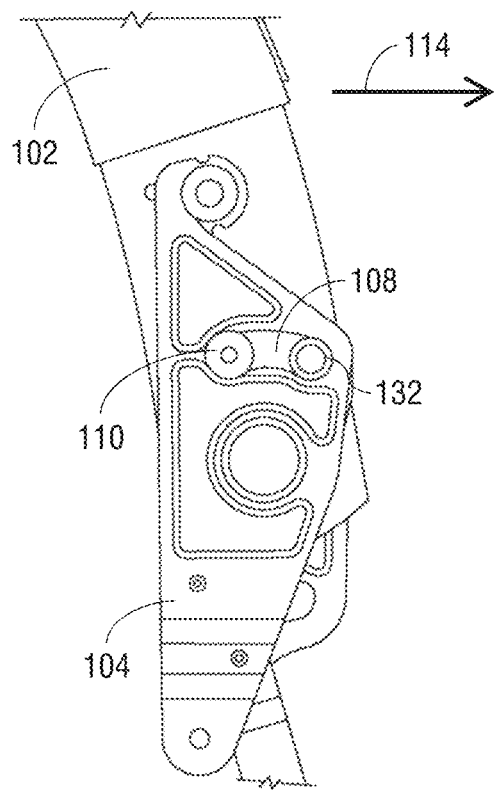
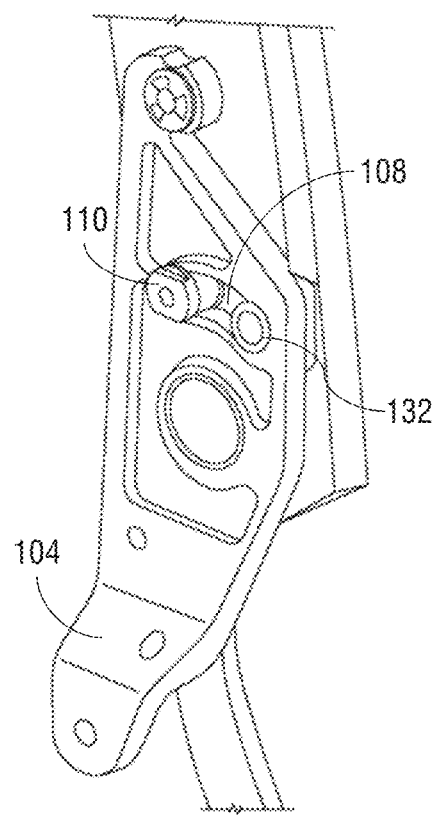
FIG. 5A  FIG. 5B

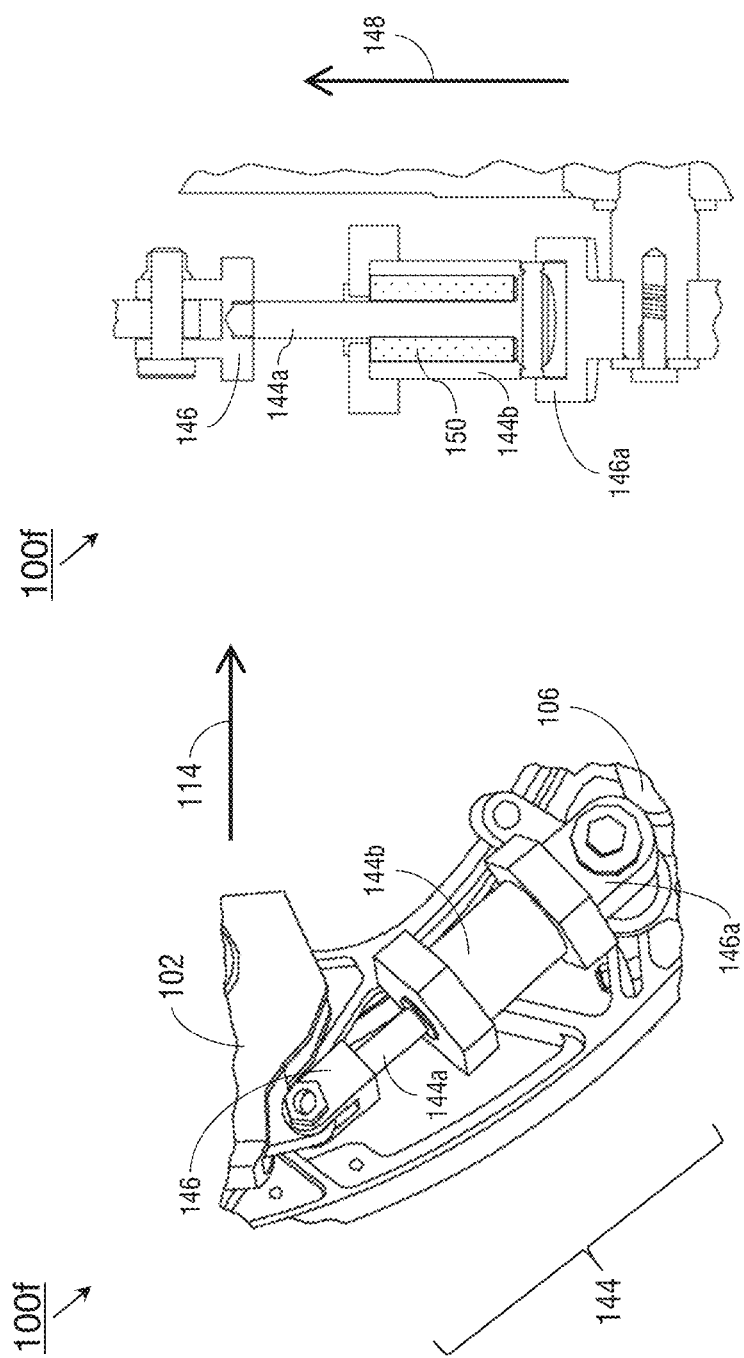

BACK BREAKOVER RATE CONTROL DEVICE FOR HIC/NIJ DAMAGE REDUCTION

BACKGROUND

Aircraft seating configurations may provide for a seatback capable of breaking over during a dynamic event. For example, a passenger seat may broadly comprise a bottom chassis (upon which the passenger sits) and a seatback supporting the passenger's upper body, the rear of which seatback may face a second passenger sitting directly behind the passenger occupying the seat. The seatback may comprise, for example, a tray table assembly, tablet holder, literature pocket, display screen and console, or any combination of these components. In the event of a crash, rapid deceleration, emergency landing, or other similar impact event, the second passenger's head may be driven forward into the seatback, which may then pivot, or break over, to a full breakover position at a predetermined angle to the bottom chassis. Seatback breakover may thus mitigate head and/or neck injuries to the second passenger due to a head impact with the seatback.

However, if the seatback is allowed to breakover freely from the upright position to the full breakover position without any regulation of breakover speed, the resulting disparity in velocity between the seatback and the head of the second passenger may increase, rather than decrease, head injury and neck injury criteria (HIC, $N_{13}$) and lead to preventable egress damage which may impede passenger egress from the aircraft.

SUMMARY

In one aspect, embodiments of the inventive concepts disclosed herein are directed to a device for controlling the breakover rate (e.g., breakover velocity) of a seatback in response to a dynamic event. The device includes a head injury criterion (HIC) link bracket attachable to the seatback and rigidly attachable to the seat frame, the bracket having a slot capable of accepting a HIC pin that transmits the breakover energy of the seatback. The bracket may include breakover control elements fashioned of energy absorbing materials extending into the slot. The breakover control materials engage with the HIC pin during the breakover event and restrict the breakover velocity of the seatback to optimize the velocity differential between the breakover velocity and the impact velocity of an object (e.g., a passenger, particularly the head thereof) colliding with the seatback during the dynamic event by absorbing at least a portion of the breakover energy transmitted by the HIC pin as it passes through the slot.

In a further aspect, embodiments of the inventive concepts disclosed herein are directed to a device for controlling the breakover rate of a seatback in response to a dynamic event. The device includes a HIC link bracket to which breaking elements are attached. The transit of the HIC pin through the slot (or a corresponding transit of a shearing link attached to the HIC link bracket and driven by the breakover energy of the seatback) is impeded, absorbing a portion of the breakover energy and restricting the breakover velocity to optimize the velocity differential between the breakover velocity and the impact velocity of an object (e.g., a passenger) colliding with the seatback during the dynamic event, by forcing the breaking element or the HIC pin to compress, bend, shear, or otherwise break one or more breakable elements of the HIC link bracket, the breakable elements being configured to fail upon absorbing a threshold level of energy.

In a still further aspect, embodiments of the inventive concepts disclosed herein are directed to a piston-driven device for controlling the breakover rate of a seatback in response to a dynamic event. The device includes a piston attached to the seatback at the rod end and to the seat frame at the barrel end. A breakover event extends the stroke of the piston. The barrel end of the piston may include compressible or energy absorbing materials configured to restrict the breakover velocity of the seatback to optimize the velocity differential between the breakover velocity and the impact velocity of an object (e.g., a passenger) colliding with the seatback during the dynamic event by impeding the extension of the piston and absorbing a portion of the breakover energy of the seatback.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 3A and 3B illustrate the device of FIG. 1;

FIGS. 4A and 4B illustrate the device of FIG. 1;

FIGS. 5A and 5B illustrate the device of FIG. 1;

FIGS. 8A and 8B illustrate the device of FIG. 1; and

DETAILED DESCRIPTION OF EXEMPLARY EMBODIMENTS

Figure 1:
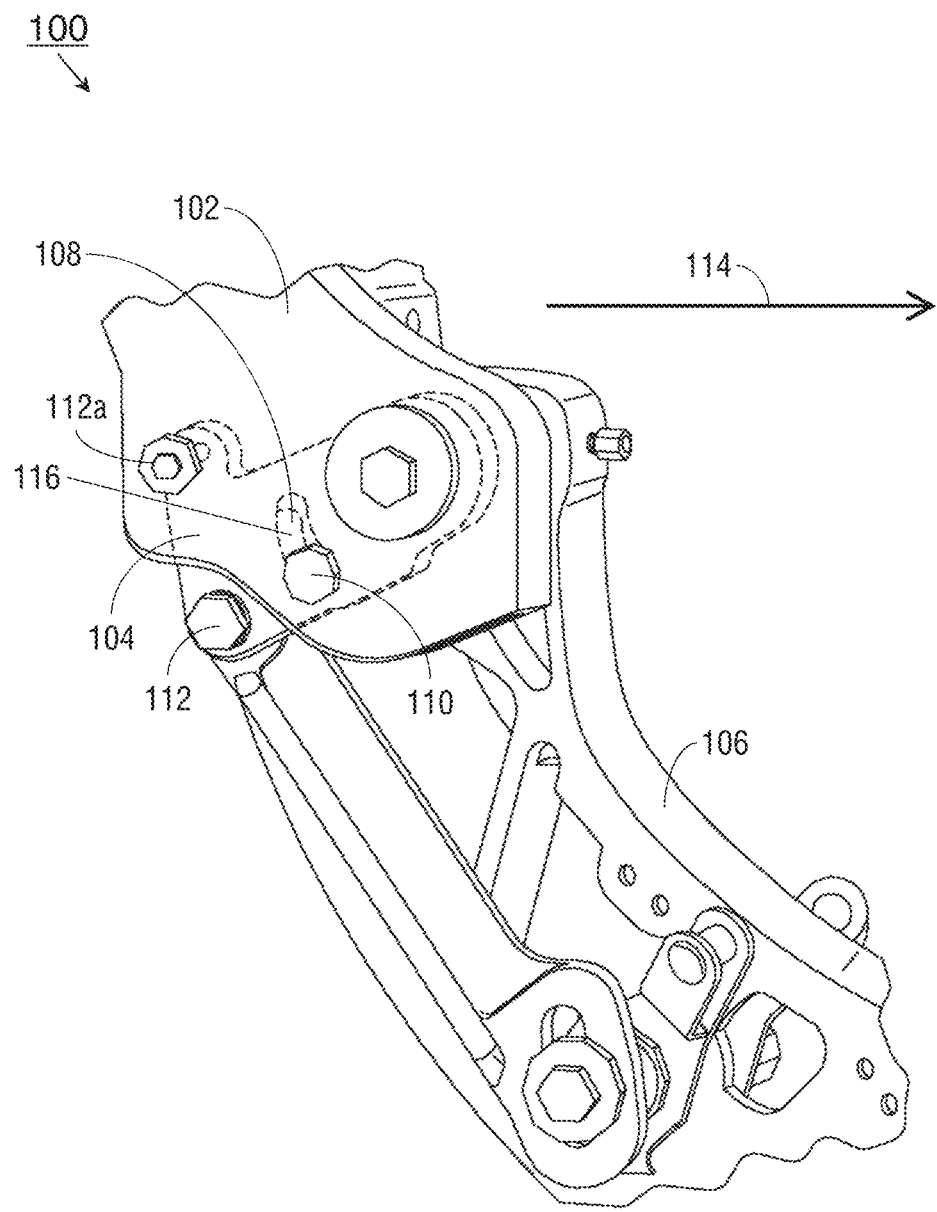
FIG. 1 illustrates an exemplary embodiment of a device for controlling the breakover rate of a seatback according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for regulating the breakover velocity of a seatback during a breakover event or similar dynamic event. By controlling the absorption of energy during the breakover event, the breakover velocity can be restricted to achieve an optimal differential with the impact velocity of a passenger (or other object) colliding with the seatback, in order to reduce the risk of head or neck injury to the passenger or egress damage to the seatback.

Referring to FIG. 1, an exemplary embodiment of a device 100 for controlling the breakover rate of a seatback 102 includes a head injury criterion (HIC) link bracket 104 fixed to the seatback 102 and the seat frame 106. The HIC link bracket 104 may include a controlled traveling slot (108) capable of accepting a HIC pin (110) fixed to the seatback and capable of transferring the energy of the seatback 102 during a breakover event in response to a dynamic event (e.g., a rapid deceleration) whereby the seatback 102 breaks over from an upright position to a full breakover position (e.g., at a predetermined angle or orientation to a seat cushion or the floor of the vehicle interior in which the seat is installed). For example, the seatback 102 may break over at a breakover velocity in order to prevent injury to a passenger seated behind the seatback 102 (e.g., head injuries due to arm strikes) or to prevent damage to rear-mounted components of the seatback 102.

However, the head of the passenger may impact the seatback 102 (and be propelled generally forward into the seatback 102) at an impact velocity which may remain consistent or indicate acceleration as the passenger's head is propelled forward. If the differential between the breakover velocity and the impact velocity is too great, the mismatch in velocity between the seatback 102 and the passenger's impacting head may escalate the risk of injury to the head or neck of the passenger (e.g., increasing HIC or normalized neck injury criterion ($N_{ij}$) values). HIC characterizes the probability of injury to the head as a result of an impact, while $N_{ij}$ assesses injury to the neck due to the interaction of axial tensile and compression forces, and flexion (forward) and extension (backward) bending moments. Multiple variables may influence HIC and $N_{ij}$ factors, including (but not limited to): the weight of the seatback 102; rear-mounted components or features of the seatback 102; the stiffness of the seatback 102 and/or seat frame 106; and the seat pitch, or the distance between one seat and the next. In addition, the velocity mismatch may result in damage to rear-mounted seatback components that may impede egress from the aircraft. Accordingly, the device 100 may be configured in a variety of ways to best control the breakover velocity so as to achieve an optimal differential between and the impact velocity.

As noted above, a breakover event may be triggered by, e.g., rapid deceleration of the aircraft or vehicle. The HIC link bracket 104 may be attached to the seat frame 106 by both a rigid attachment (112) and a breakaway attachment (112a) configured, e.g., to shear or fail upon absorbing sufficient energy to trigger a breakover event. As the seatback 102 breaks over forward (114), the breakover energy of the seatback 102 may be transmitted via the HIC pin 110 fixed to the seatback 102. The device 100 may absorb a portion of the breakover energy, and thereby restrict the breakover velocity of the breakover (114) to optimize the velocity differential with the impact velocity, via energy absorbing breakover elements (116) capable of impeding the passage of the HIC pin 110 through the controlled traveling slot 108 or otherwise impeding the breakover energy of the seatback 102. The energy absorbing breakover elements 116 may be fashioned of one or more of a metal, polymer, or composite material. By way of a non-limiting example, the breakover event (114) may extend from a time $T_0$ of initial impact (e.g., impact of the head with the seatback 102) to a time $T_F$ at which the full breakover position of the seatback 102 is achieved and breakover ceases. The optimal velocity differential driving the degree to which the breakover velocity is restricted may comprise a range between an upper bound and a lower bound, or may be associated with a target velocity to which the breakover velocity is restricted. In other words, to prevent too great a velocity differential between the breakover velocity and the impact velocity, the device 100 may prevent the breakover velocity from becoming either too high or too low. For example, HIC and $N_{ij}$ values corresponding to the risk of head or neck injury may increase if the seatback 102 (breakover velocity) breaks over either too rapidly or too slowly relative to the impact velocity. By restricting the breakover velocity to optimize velocity differential with the impact velocity (e.g., based on likely values for the impact velocity for a passenger of average weight and height under the most common conditions where breakover is likely to occur) the HIC and $N_{ij}$ values associated with a likely dynamic event may be optimized.

Figure 2A:
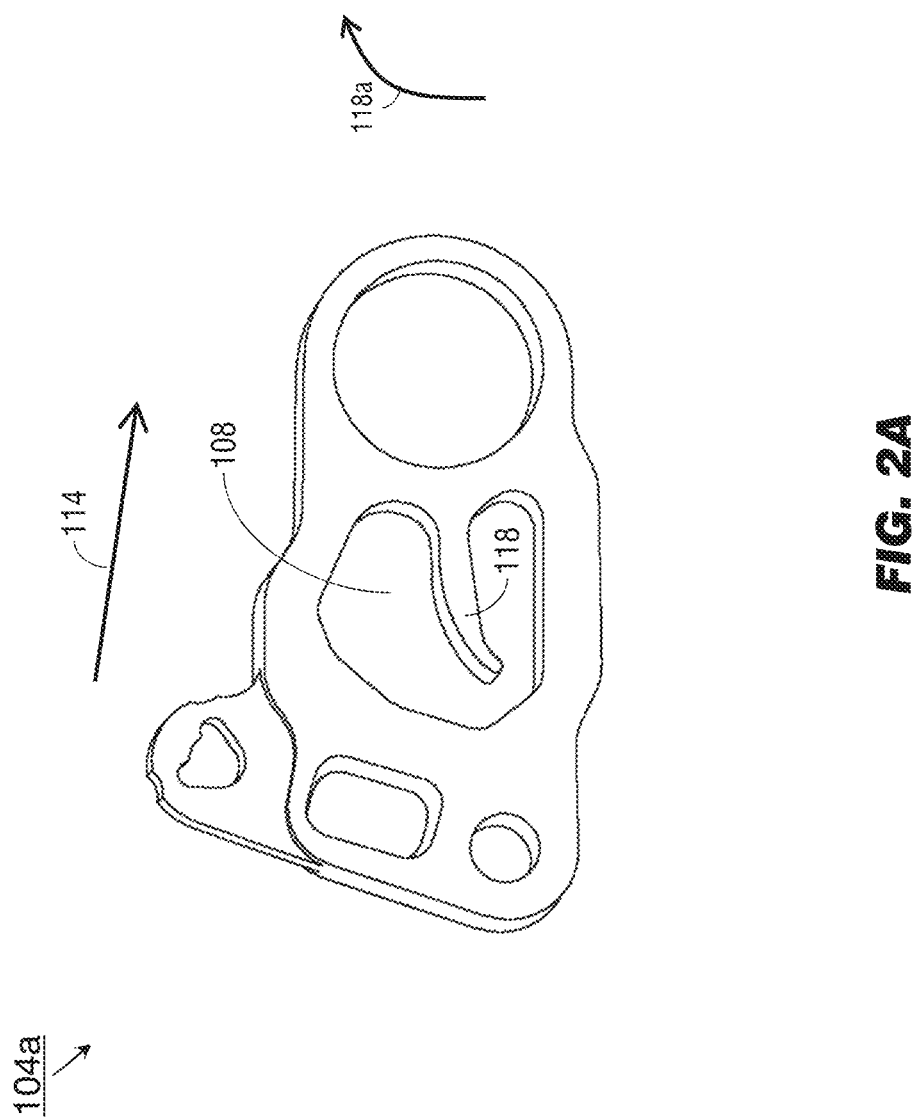
FIG. 2A illustrates a head injury criterion (HIC) link bracket of the device of FIG. 1.

Referring now to FIG. 2A, the HIC link bracket 104a may be implemented and may function similarly to the HIC link bracket 104 of FIG. 1, except that the HIC link bracket 104*a* may include a "finger" or similar appendage (118) extending into the controlled traveling slot 108 capable of bending or deforming (118*a*) at a predetermined deformation rate in response to engagement by the seatback 102 (e.g., via the HIC pin (110, FIG. 1), absorbing the breakover energy of the breakover event (114) and restricting the breakover velocity.

Figure 2B:
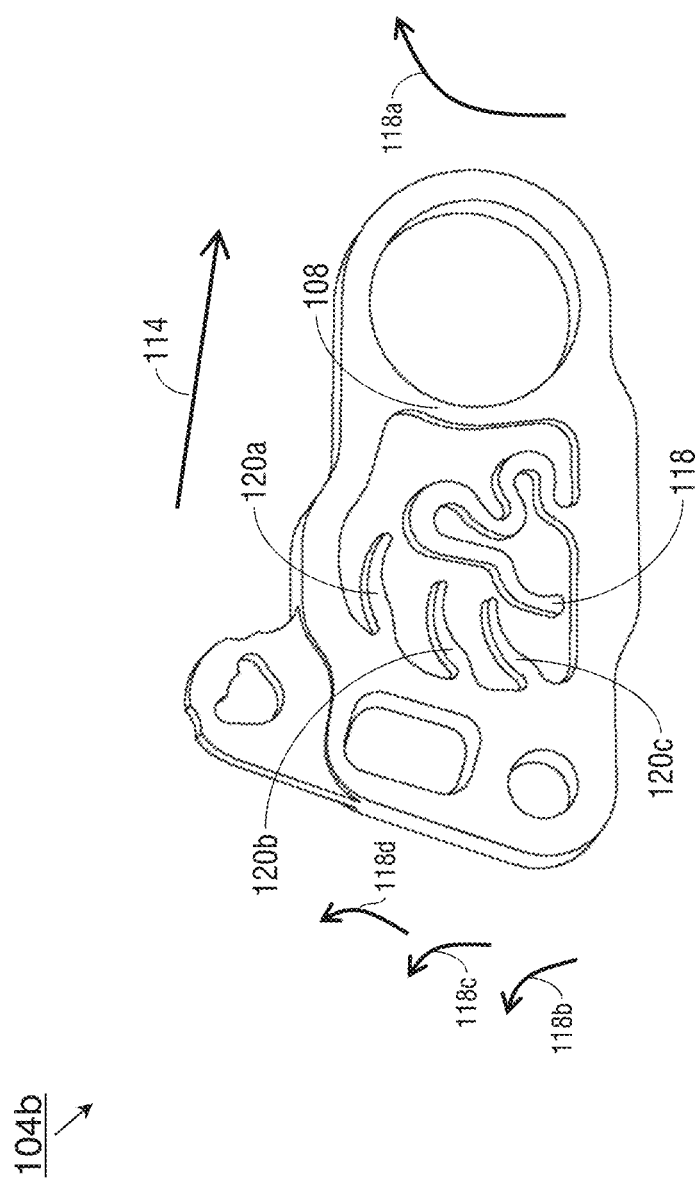
FIG. 2B illustrates a HIC link bracket of the device of FIG. 2A.

Referring now to FIG. 2B, the HIC link bracket 104*b* may be implemented and may function similarly to the HIC link bracket 104*a* of FIG. 2A, except that the HIC link bracket 104*b* may include within the controlled traveling slot 108, in addition to a primary appendage 118 configured to bend backwards upon engagement by the HIC pin (110, FIG. 1), one or more secondary appendages 120*a-c*. As the primary appendage 118 bends backward (118*a*) upon engagement by the HIC pin 110, absorbing the energy of the breakover event (114), the primary appendage 118 may sequentially engage the secondary appendages 120*a-c*, bending each secondary appendage 122*a-c* backward (118*b-d*) in succession. The secondary appendages 122*a-c* may each be fashioned of a different material, or may have a different density or structure, such that, e.g., the secondary appendage 122*a* may absorb a greater quantity of energy, or deform at a different deformation rate, than the secondary appendage 122*c*.

Referring now to FIGS. 3A and 3B, the device 100*a* may be implemented and may function similarly to the device 100 of FIG. 1, except that the device 100*a* may include a HIC link bracket 104 to which a deformable clip (124) may be attached. The deformable clip 124 may be fashioned from any appropriate material or combination of materials and tunable depending on the desired deformation rate or optimal velocity differential. The deformable clip 124 may include an engineered slot (126) through which the HIC pin 110 fixed to the seatback 102 passes as the seatback 102 breaks over (114) in response to the dynamic event. The engineered slot 126 may restrict the breakover velocity by absorbing energy transferred by the HIC pin 110, providing resistance to the HIC pin as the HIC pin passes forward and deforms the engineered slot. The engineered slot 126 may provide a variable deformation rate by offering variable resistance to the HIC pin 110 as the HIC pin progresses through the engineered slot 126. The deformable clip 124 may be removably attachable to the HIC link bracket 104 without the use of specialized tools, and detachable with minimal force to aid in egress (e.g., so that the seatback 102 may be quickly and easily uprighted to facilitate rapid and safe evacuation in the event of an emergency) once the deformable clip 124 has deployed in response to a dynamic event.

Referring now to FIGS. 4A and 4B, the device 100*b* may be implemented and may function similarly to the device 100 of FIG. 1, except that the HIC link bracket 104 of the device 100*b* may include a "nail" 128 or similar projecting appendage fashioned of energy absorbing material. As the seatback 102 breaks over (114) in response to a dynamic event, the HIC pin 110 passing through the controlled traveling slot 108 may "hammer" the "nail" 128 by forcing the "nail" through an orifice (130) having a diameter, or volume, smaller than that of the "nail" (128), absorbing the breakover energy by deforming the "nail" 128 and restricting the breakover velocity. The material composition of the "nail" 128, and the dimensions of both the "nail" 128 and the orifice 130, may be selected to achieve the desired degree of energy absorption.

Referring to FIGS. 5A and 5B, the device 100*c* may be implemented and may function similarly to the device 100 of FIG. 1, except that the device 100*c* may include a HIC link bracket 104 wherein an energy attenuating insert (132) may be removably inserted into the controlled traveling slot 108, e.g., for one-time use. For example, the material composition and geometric structure of the energy attenuating insert (132) may be tuned to absorb a particular amount of energy or deform at a particular rate (e.g., via a hollow tubular structure). As the HIC pin 110 is driven forward by the seatback 102 through the controlled traveling slot 108, the energy attenuating insert 132 may be crushed during the breakover event (114).

Figure 6:
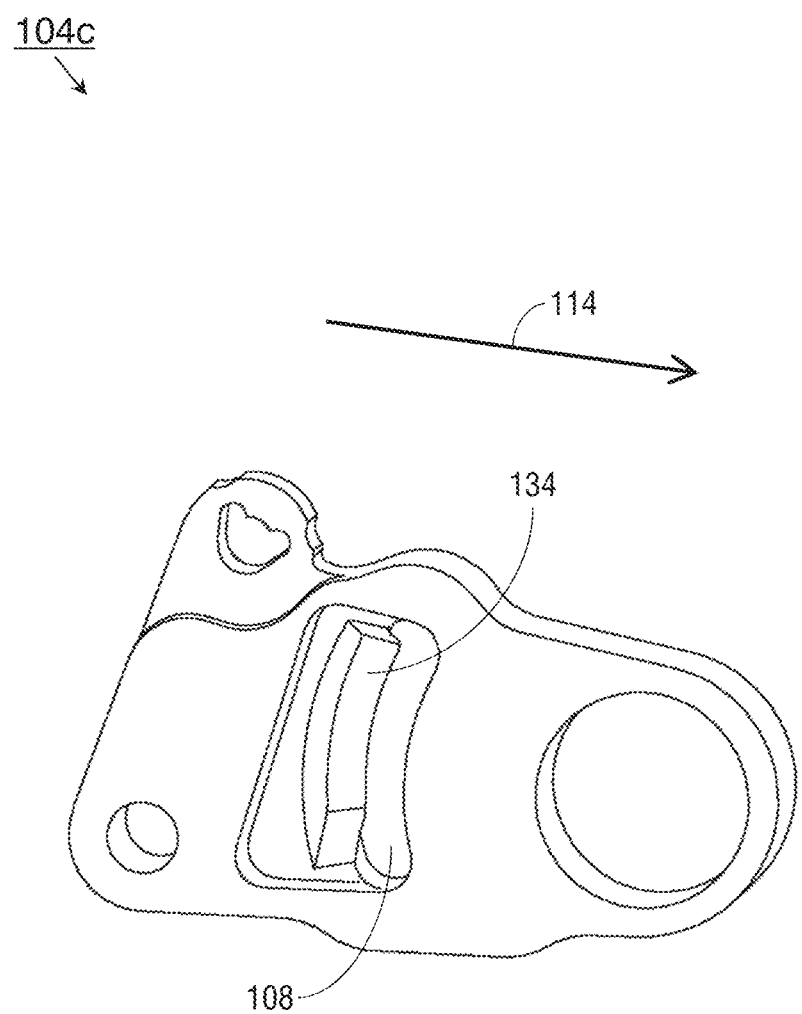
FIG. 6 illustrates a HIC link bracket of the device of FIG. 1.

Referring now to FIG. 6, the HIC link bracket 104*c* may be implemented and may function similarly to the HIC link bracket 104 of FIG. 1, except that the HIC link bracket 104*c* may include a quantity of deformable material (134) (e.g., shearable, compressible, or bendable material) extending into, or adjacent to, the controlled traveling slot 108. The deformable material 134 may be capable of regulating the breakover velocity by providing resistance to the seatback 102 (FIG. 1) during a breakover event (114). For example, as the seatback 102 breaks over in response to a dynamic event, the HIC pin (110, FIG. 1) may be driven through the controlled traveling slot 108, engaging with and deforming a portion of the deformable material 134 from the HIC link bracket 104*c*, restricting the breakover velocity. The composition and quantity of the deformable material 134 may be adjusted to achieve the desired degree of energy absorption.

Figure 7A:
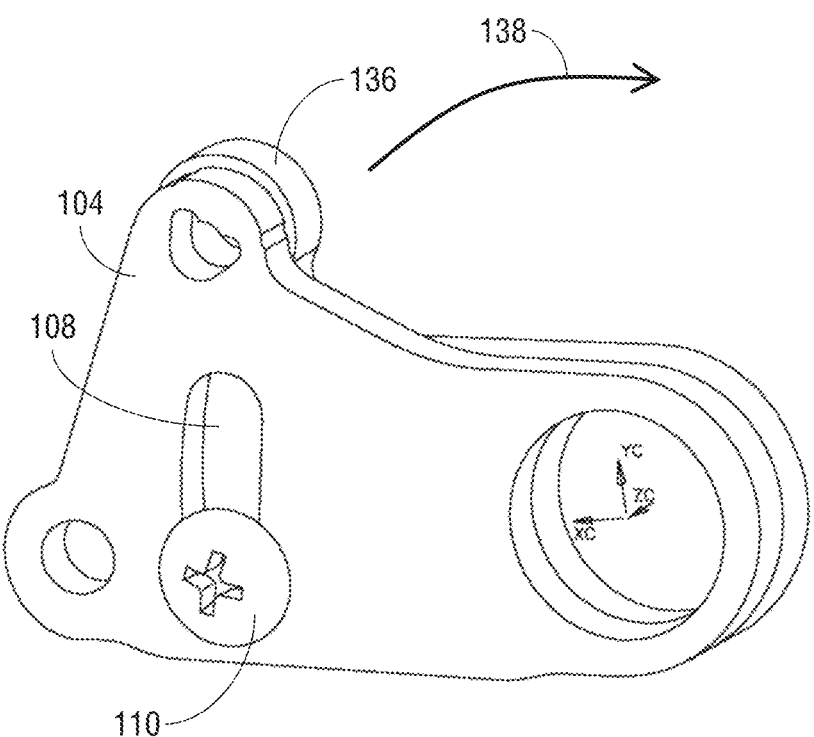
FIG. 7A illustrates the device of FIG. 1.
Figure 7B:
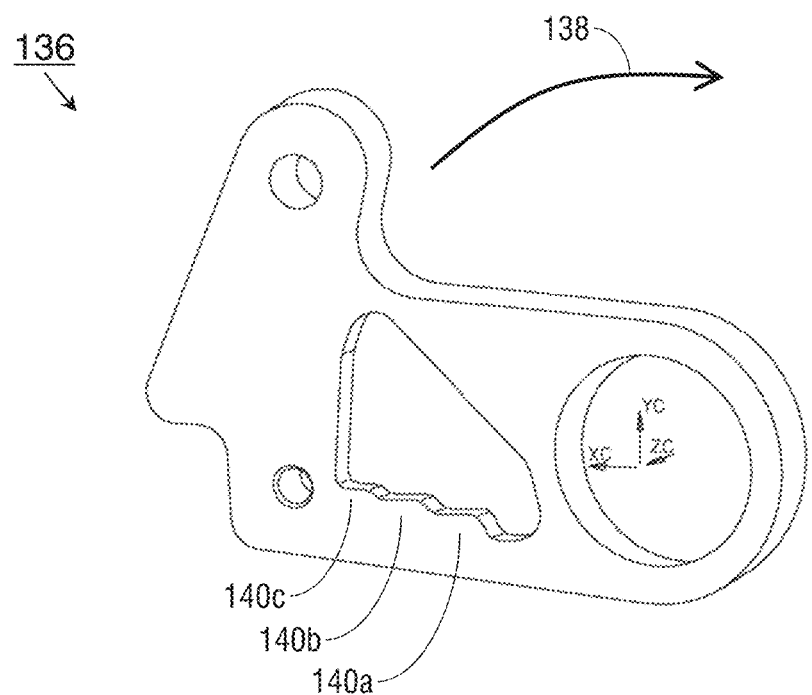
FIG. 7B illustrates a shearing link, and FIG. 7C a HIC link bracket, of the device of FIG. 7A.
Figure 7C:
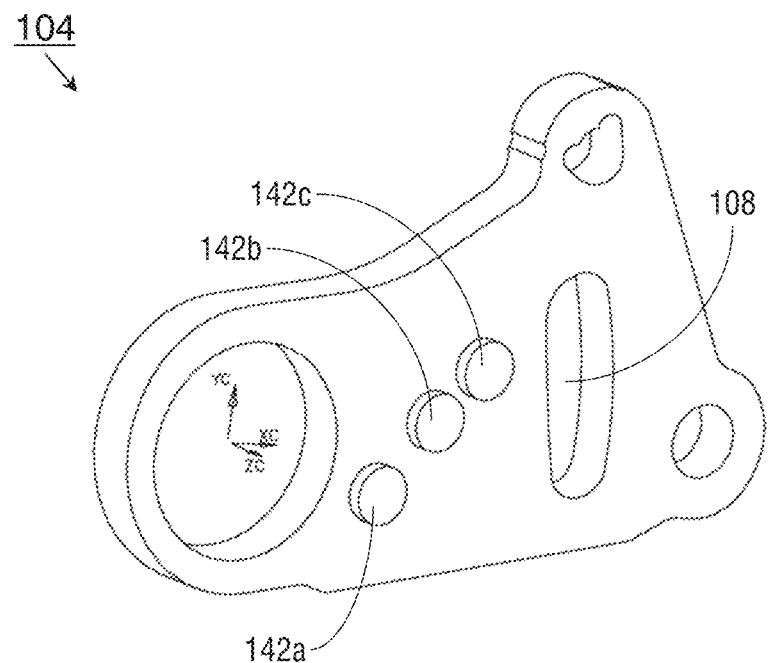
FIGS. 7D through 7F illustrate the device of FIG. 1.

Referring to FIGS. 7A through 7C, the device 100*d* may be implemented and may function similarly to the device 100 of FIG. 1, except that the device 100*d* may include a breaking element (136) rotatably coupled to the HIC link bracket 104. For example, referring in particular to FIG. 7A, during a breakover event the HIC pin 110 may be driven through the controlled traveling slot 108 of the HIC link bracket 104, driving the breaking element 136 rotatably forward (138). Referring in particular to FIGS. 7B and 7C (FIG. 7C illustrating a reverse view of the HIC link bracket 104), the breaking element 136 may include, e.g., a stepped series of breaking ridges 140*a-c*. For example, as the breaking element 136 is driven rotatably forward (138) during the breakover event (114, FIG. 1), the breaking ridges 140*a-c* may successively engage a series of opposing breakable pins (142*a-c*) on the reverse face of the HIC link bracket 104, breaking the breakable pins 142*a-c* as each breakable pin absorbs the breakover energy (e.g., tensile loads, compression loads, shear loads, or any combination thereof) and fails upon reaching a predetermined failure threshold. In some embodiments, the breakable pins 142*a-c* may be fashioned of different materials or designed to different failure thresholds, depending on the desired velocity differential or energy absorption rate.

Figure 7D:
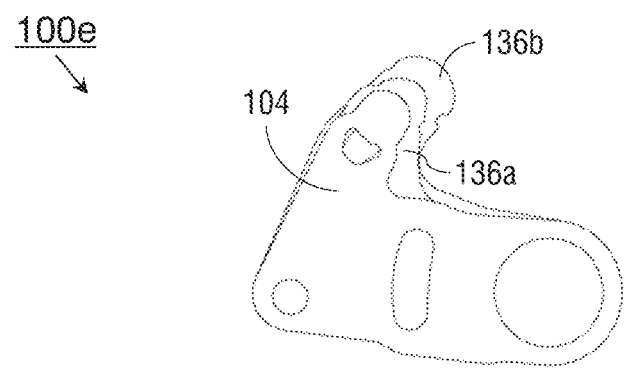
Figure 7E:
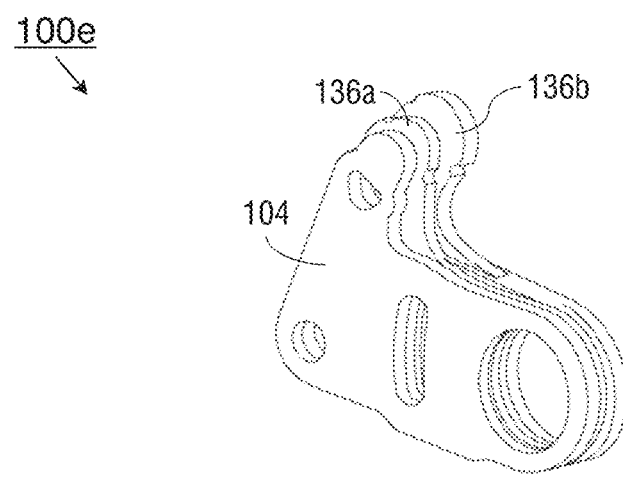
Figure 7F:
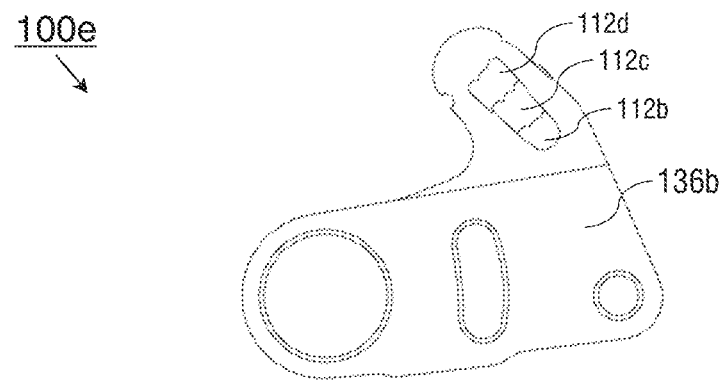

Referring now to FIGS. 7D through 7F, the device 100*e* may be implemented and may function similarly to the device 100*d* of FIGS. 7A-7C, except that the device 100*d* may include multiple breaking elements 136*a-b* rotatably coupled to the HIC link bracket 104. For example, referring in particular to FIG. 7F (showing a reverse view of the device 100*e*), each breaking element 136*a-b* may be coupled to the seatback by a separate breakaway attachment 112*b-d*, each breaking element or breakaway attachment configured to fail under a particular predetermined load.

Referring to FIGS. 8A and 8B, the device 100*f* may be implemented and may function similarly to the device 100 of FIG. 1, except that the device 100*f* may include a piston 144 having a rod end 144*a* attached to the seatback 102 (e.g., via hinged bracket 146) and a barrel end 144*b* attached to the seat frame 106 (e.g., via hinged bracket 146*a*). For example, during a breakover event (114), the seatback 102 may rotate forward and extend the stroke (148) of the piston 144. The device 100f may restrict the breakover velocity via compressible material (150) within the barrel (144b) of the piston 144. Compression of the compressible material 150 by the piston 144 may impede the extension (stroke 148) of the piston 144 and restrict the velocity at which the seatback 102 rotates forward during the breakover event.

Figure 9:
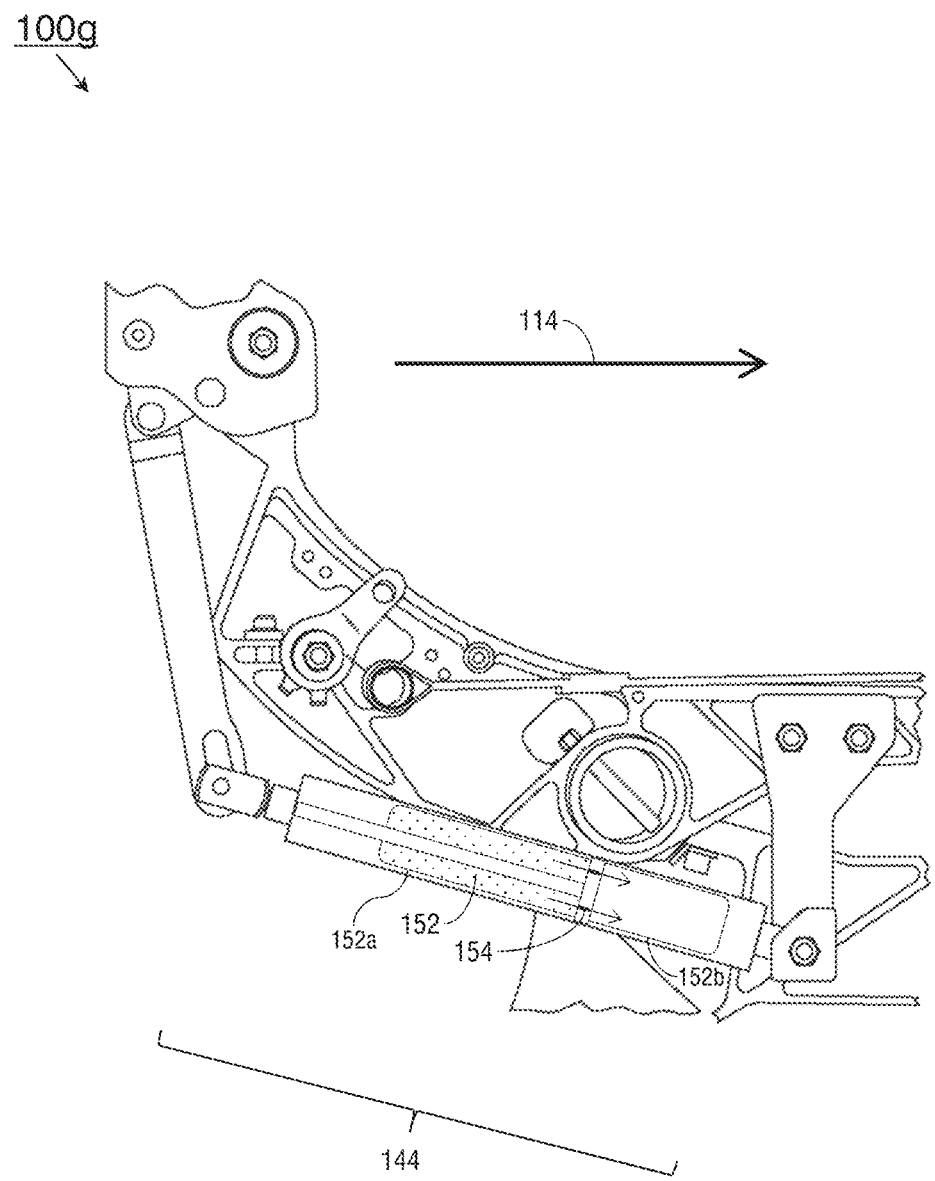
FIG. 9 illustrates the device of FIG. 1.

Referring to FIG. 9, the device 100g may be implemented and may function similarly to the device 100f of FIGS. 8A and 8B, except that the device 100g may be a hydraulic dampener wherein, for example, the piston 144 encloses a fluid material (152). For the stroke (148, FIG. 8B) of the piston 144 to extend in response to a breakover by the seatback 102, the piston 144 must drive the fluid material (152) through one or more orifices (154) from a first compartment (152a) to a second compartment (152b). The fluid material 152 may provide resistance to the piston 144, absorbing energy and restricting the breakover velocity of the seatback 102.

As will be appreciated from the above, systems and methods according to embodiments of the inventive concepts disclosed herein may regulate the breakover velocity to achieve an optimal differential with the impact velocity (and thereby optimal HIC and $N_{ij}$ values) by controlling the transition from a high energy state to a low energy state during the breakover event through the use of targeted materials that may be efficiently produced and easily removed or detached after a one-time use.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A device for controlling the breakover rate of a seatback, comprising:

at least one bracket rigidly attachable to a seatback of a seat, the at least one bracket including at least one opening configured to accept at least one pin fixed to the seat and capable of transmitting a breakover energy associated with the seatback and corresponding to a dynamic event, the opening having at least one of a first diameter and a first volume, the at least one bracket including at least one breakover control element having at least one of a second diameter greater than the first diameter and a second volume greater than the first volume, the breakover control element configured to be driven by the at least one pin through the opening to at least one of a) restrict a breakover velocity of the seatback and b) absorb at least a portion of the breakover energy by deforming at a predetermined deformation rate.

2. The device of claim 1, wherein the at least one breakover control element is configured to engage the at least one pin by deforming at a variable deformation rate in response to the at least one pin, the variable deformation rate within a predetermined range of deformation rates.

3. The device of claim 1, wherein the at least one breakover control element is removably insertable in the at least one opening and configured to engage the at least one pin via directed deformation.

4. The device of claim 1, wherein the at least one breakover control element is configured to fail upon absorption of a predetermined load.

5. A device for controlling a breakover rate of a seatback, comprising:

at least one bracket rigidly attachable to a seatback of a seat, the at least one bracket including at least one opening configured to accept at least one pin fixed to the seat and capable of transmitting a breakover energy associated with the seatback and corresponding to a dynamic event, the at least one bracket including one or more breakover control elements configured to be driven by the at least one pin through the opening extending into the at least one opening and configured for engaging the at least one pin to at least one of a) restrict a breakover velocity of the seatback and b) absorb at least a portion of the breakover energy by deforming at a predetermined deformation rate, the one or more breakover control elements comprising:

at least one first breakover control element configured to engage the at least one pin by deforming in response to the at least one pin;

and at least one second breakover control element configured to engage the at least one first breakover control element by deforming in response to the deforming of the at least one first breakover control element.

* * * * *